United States Patent
Cloutier

(10) Patent No.: US 11,542,875 B2
(45) Date of Patent: Jan. 3, 2023

(54) METHOD AND SYSTEM FOR DETERMINING AN ENGINE TEMPERATURE

(71) Applicant: PRATT & WHITNEY CANADA CORP., Longueuil (CA)

(72) Inventor: Yves Cloutier, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 70 days.

(21) Appl. No.: 16/906,637

(22) Filed: Jun. 19, 2020

(65) Prior Publication Data
US 2021/0285386 A1    Sep. 16, 2021

Related U.S. Application Data

(60) Provisional application No. 62/990,100, filed on Mar. 16, 2020.

(51) Int. Cl.
   *F02C 9/28*    (2006.01)
(52) U.S. Cl.
   CPC ............ *F02C 9/28* (2013.01); *F05D 2240/35* (2013.01); *F05D 2270/301* (2013.01); *F05D 2270/303* (2013.01)
(58) Field of Classification Search
   CPC ........................................................ F02C 9/20
   See application file for complete search history.

(56) References Cited

U.S. PATENT DOCUMENTS

| 4,055,997 | A | 11/1977 | Kniat |
| 7,617,686 | B2 | 11/2009 | Lilly et al. |
| 9,464,564 | B2 | 10/2016 | Zavala Jurado et al. |
| 2011/0154821 | A1 | 6/2011 | Evans-Beauchamp |
| 2019/0234233 | A1 | 8/2019 | Ling et al. |

FOREIGN PATENT DOCUMENTS

JP    H0472430 A    3/1992

OTHER PUBLICATIONS

Extended European Search Report dated Jul. 29, 2021 in counterpart European application No. 21162962.1.

*Primary Examiner* — Katheryn A Malatek
(74) *Attorney, Agent, or Firm* — Norton Rose Fulbright Canada LLP

(57) ABSTRACT

Methods and systems for determining an engine temperature for a gas turbine engine are provided. An estimated combustor temperature is determined based on at least one operating condition of the gas turbine engine and an estimated vane mass flow. A corrected vane mass flow is determined based on the estimated combustor temperature, the estimated vane mass flow, and a combustor pressure. The corrected vane mass flow is compared to a reference vane mass flow to obtain the mass flow correction factor. When a condition associated with the mass flow correction factor is not satisfied, the estimated combustor temperature is adjusted based on the mass flow correction factor to produce an adjusted combustor temperature; and the mass flow correction factor is updated based on the adjusted combustor temperature. When the condition associated with the mass flow correction factor is satisfied, the estimated combustor temperature is assigned as the engine temperature.

20 Claims, 8 Drawing Sheets

300

310 Determining a mass flow correction factor

320 Mass flow correction condition satisfied?

330 Adjusting the estimated combustor temperature based on the mass flow correction factor to produce an adjusted combustor temperature

340 Updating the mass flow correction factor based on the adjusted combustor temperature

360 Issuing a signal to assign the estimated combustor temperature as the engine temperature

FIG. 3A

METHOD AND SYSTEM FOR DETERMINING AN ENGINE TEMPERATURE

CROSS-REFERENCE TO RELATED APPLICATIONS

The present application claims the benefit of U.S. Provisional Application Ser. No. 62/990,100, filed on Mar. 16, 2020, the entire contents of which are hereby incorporated by reference.

TECHNICAL FIELD

The present disclosure relates generally to gas turbine engines, and more particularly to temperature determination in gas turbine engines.

BACKGROUND

In a gas turbine engine, continuous inlet air is compressed, mixed with fuel in an inflammable proportion, and exposed to an ignition source to ignite the mixture which then continues to burn to produce combustion products. The combustion of the air-fuel mixture can be used to power various mechanical components, which in turn can be used to produce thrust.

Monitoring of various temperatures within the engine during operation thereof can be of interest in assisting a control system or an operator responsible for the engine. Although existing approaches for measuring engine temperature are suitable for their purposes, improvements remain desirable.

As such, there is room for improvement.

SUMMARY

In accordance with a broad aspect, there is provided a method for determining an engine temperature for a gas turbine engine. An estimated combustor temperature is determined based on at least one operating condition of the gas turbine engine and an estimated vane mass flow. A corrected vane mass flow is determined based on the estimated combustor temperature, the estimated vane mass flow, and a combustor pressure. The corrected vane mass flow is compared to a reference vane mass flow to obtain the mass flow correction factor. When a condition associated with the mass flow correction factor is not satisfied, the estimated combustor temperature is adjusted based on the mass flow correction factor to produce an adjusted combustor temperature; and the mass flow correction factor is updated based on the adjusted combustor temperature. When the condition associated with the mass flow correction factor is satisfied, a signal is issued to assign the estimated combustor temperature as the engine temperature.

In accordance with another broad aspect, there is provided a system for determining an engine temperature for a gas turbine engine. The system comprises a processing unit, and a non-transitory computer-readable medium. The computer-readable medium has stored thereon instructions which are executable by the processing unit for: determining an estimated combustor temperature based on at least one operating condition of the gas turbine engine and an estimated vane mass flow; by determining a corrected vane mass flow based on the estimated combustor temperature, the estimated vane mass flow, and a combustor pressure; and by comparing the corrected vane mass flow to a reference vane mass flow to obtain the mass flow correction factor; when a condition associated with the mass flow correction factor is not satisfied, the estimated combustor temperature is adjusted based on the mass flow correction factor to produce an adjusted combustor temperature; and the mass flow correction factor is updated based on the adjusted combustor temperature; when the condition associated with the mass flow correction factor is satisfied, issuing a signal to assign the estimated combustor temperature as the engine temperature.

Features of the systems, devices, and methods described herein may be used in various combinations, in accordance with the embodiments described herein. In particular, any of the above features may be used alone, together in any suitable combination, and/or in a variety of arrangements, as appropriate.

BRIEF DESCRIPTION OF THE DRAWINGS

Reference is now made to the accompanying figures in which:

FIGS. 3A-C are flowcharts illustrating example methods for determining an engine temperature for a gas turbine engine;

It will be noted that throughout the appended drawings, like features are identified by like reference numerals.

DETAILED DESCRIPTION

Figure 1:
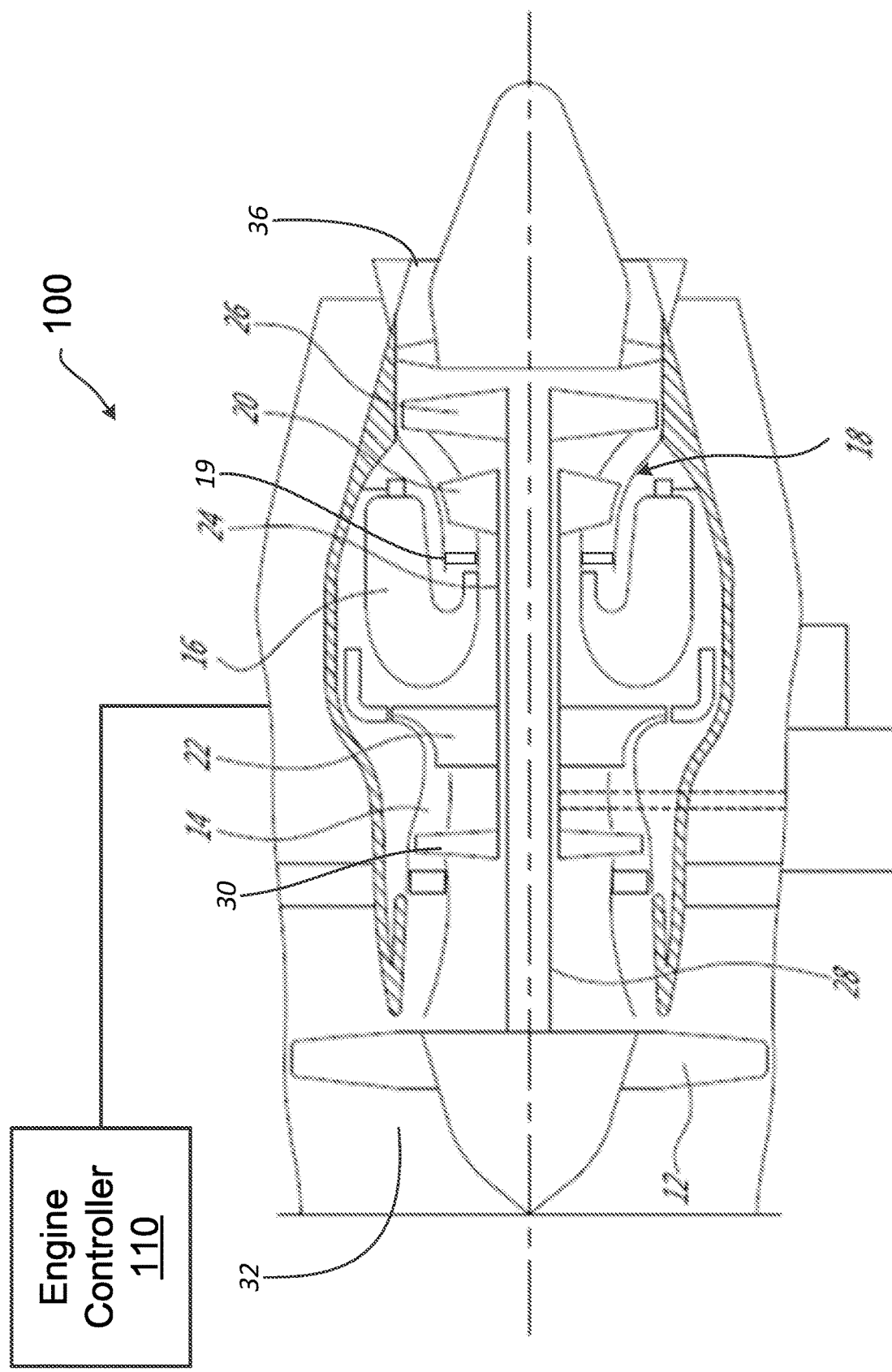
FIG. 1 is a schematic cross-sectional view of an example gas turbine engine.

FIG. 1 illustrates a gas turbine engine 100 of a type provided for use in subsonic flight, generally comprising in serial flow communication, a fan 12 through which ambient air is propelled toward an inlet 32, a compressor section 14 for pressurizing the air, a combustor 16 in which the compressed air is mixed with fuel and ignited for generating an annular stream of hot combustion gases, and a turbine section 18 for extracting energy from the combustion gases, which exit via an exhaust 36. High-pressure rotor(s) of the turbine section 18 (referred to as "HP turbine rotor(s) 20") are drivingly engaged to high-pressure rotor(s) of the compressor section 14 (referred to as "HP compressor rotor(s) 22") through a high-pressure shaft 24. The turbine section 18 includes a vane 19 between the combustor 16 and the HP turbine rotor(s) 20. Low-pressure rotor(s) of the turbine section 18 (referred to as "LP turbine rotor(s) 26") are drivingly engaged to the fan rotor 12 and to low-pressure rotor(s) of the compressor section 14 (referred to as "LP compressor rotor(s) 30") through a low-pressure shaft 28 extending within the high-pressure shaft 24 and rotating independently therefrom.

Although illustrated as a turbofan engine, the gas turbine engine 100 may alternatively be another type of engine, for example a turboshaft engine, also generally comprising in serial flow communication a compressor section, a combustor, and a turbine section, and an output shaft through which power is transferred. A turboprop engine may also apply. In addition, although the engine 100 is described herein for flight applications, it should be understood that other uses, such as industrial or the like, may apply.

Control of the operation of the engine 100 can be effected by one or more control systems, for example an engine controller 110, which is communicatively coupled to the engine 100. The engine controller 110 can modulate a fuel flow provided to the engine 100, the position and orientation of variable geometry mechanisms within the engine 100, a bleed level of the engine 100, and the like, based on predetermined schedules or algorithms. In some embodiments, the engine controller 110 includes one or more FADEC(s), electronic engine controller(s) (EEC(s)), or the like, that are programmed to control the operation of the engine 100. The operation of the engine 100 can be controlled by way of one or more actuators, mechanical linkages, hydraulic systems, and the like. The engine controller 110 can be coupled to the actuators, mechanical linkages, hydraulic systems, and the like, in any suitable fashion for effecting control of the engine 100.

Figure 2:
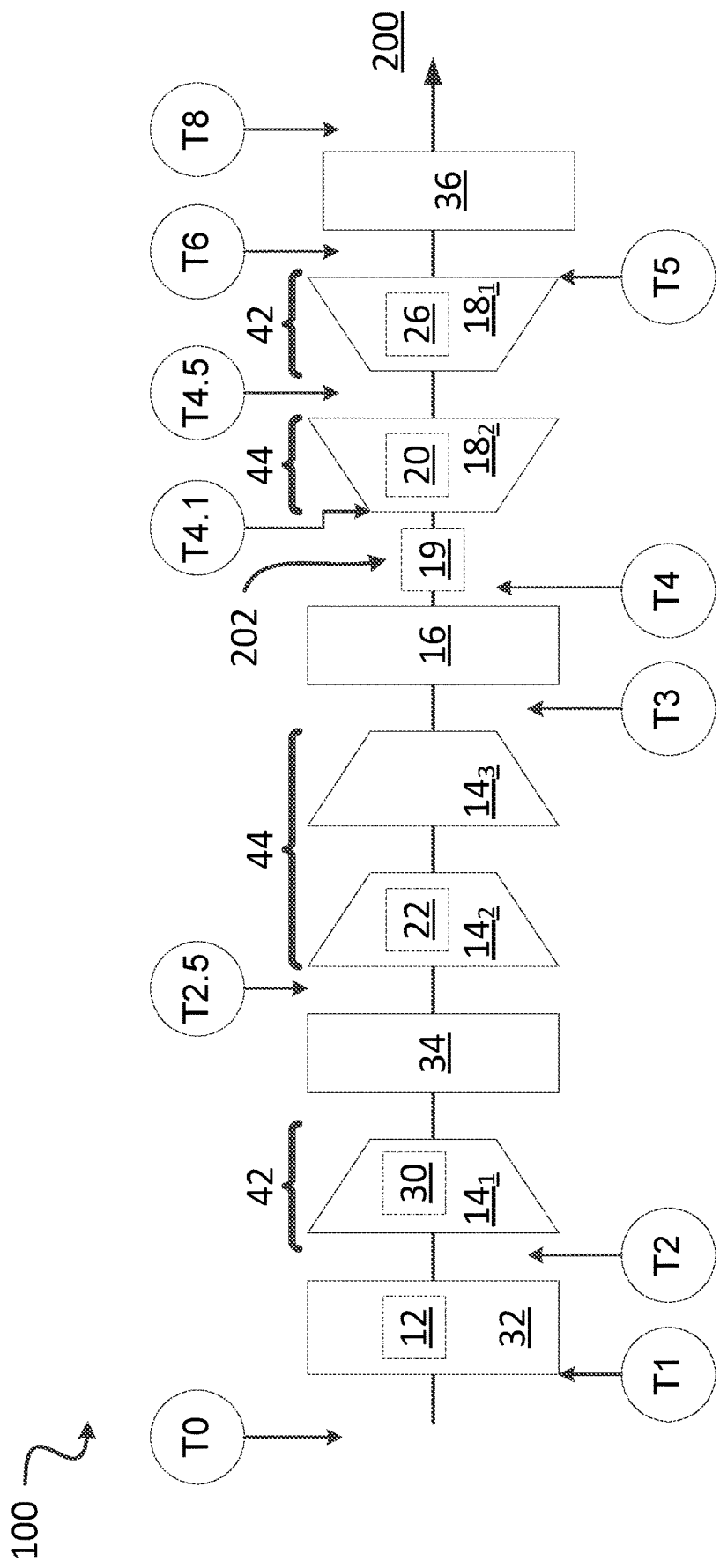
FIG. 2 is a schematic side view of a gas turbine engine showing example temperature evaluation locations.

Wth additional reference to FIG. 2, the engine 100 is illustrated schematically as having multiple elements forming a gas path along which gas flows from the inlet 32 to the exhaust 36 of the engine 100. The engine 100 illustrated in FIG. 2 includes two spools, namely a low-pressure spool 42, and a high-pressure spool 44. The low-pressure spool 42 includes a low-pressure compressor stage $14_1$, which includes the LP compressor rotor(s) 30, and a low-pressure turbine $18_1$, which includes the LP turbine rotors(s) 26. In other embodiments of the engine 100, the low-pressure spool 42 can include more than one compressor stage. The high-pressure spool 44 includes two high-pressure compressor stages $14_2$ and $14_3$ which include the HP compressor rotor(s) 22, and a high-pressure turbine $18_2$, which includes the HP turbine rotor(s) 20. In other embodiments of the engine 100, the high-pressure spool 44 can include only one compressor stage, or more than two compressor stages. In the illustrated embodiment, an inter-compressor case (ICC) 34 is disposed between the low-pressure compressor stage $14_1$ and the high-pressure compressor stage $14_2$.

As fluids, for instance a gas mixture, pass through the engine 100, they undergo numerous pressure and temperature changes. Example temperature measurement locations, T0 to T8, for the flow of the gas mixture along the gas path 200 are illustrated in FIG. 2. T0, taken upstream of the inlet 32, refers to an ambient temperature of the environment surrounding the engine 100. Although illustrated here as being captured upstream of the inlet 32, it should be understood that the ambient temperature T0 can be captured at any suitable location in the environment in which the engine 100 is operating. T1 refers to an inlet temperature, taken at the inlet 32 of the engine 100, just as the air from the environment enters through the fan rotor 12.

T2 refers to a low-pressure compressor inlet temperature, taken before the LP turbine rotor(s) 26 of the low-pressure compressor stage $14_1$. T2.5 refers to a high-pressure compressor temperature, taken between the ICC 34 and the high-pressure compressor stage $14_2$.

T3 refers to a high-pressure compressor delivery temperature, taken after the high-pressure compressor stages $14_2$ and $14_3$, for instance after the HP compressor rotor(s) 22. T4 refers to a combustor outlet temperature, taken before the HP turbine rotor(s) 20, and after the combustor 16. T4.1 refers to a temperature taken at or near an entry to the high-pressure turbine $18_2$. Measurements for T4.1 can serve as a proxy for T4 because the exit of the combustor (where T4 is taken) and the entry to the high-pressure turbine $18_2$ (where T4.1 is taken) are connected to one another. T4.5 refers to a temperature taken between the high-pressure turbine $18_2$ and the low-pressure turbine $18_1$.

Located at an intermediate point between the combustor 16 and the high-pressure turbine $18_2$ is the vane 19. The vane 19 directs the gas mixture passing through the engine 100 toward the high-pressure turbine $18_2$. The geometry of the vane 19 defines a vane throat, which is referred to hereinafter as a high-pressure turbine (HPT) vane throat 202. The HPT vane throat 202 is a narrowing at the exit of the combustor 16 formed by the vane 19. For the purposes of the present disclosure, temperature values, pressure values, or other values which are said to be evaluated at the combustor 16 may be evaluated at an outlet of the combustor 16, at the HPT vane throat 202, or at any other suitable location at or proximate to the combustor 16.

T5 refers to the turbine outlet temperature, taken after the LP turbine rotor(s) 26 of the low-pressure turbine $18_1$. T6 refers to an exhaust gas temperature, taken between the low-pressure turbine $18_1$ and the exhaust 36. T8 refers to an exhaust gas temperature, taken at the outlet of the exhaust 36.

It should be noted that the above description of FIG. 2 pertains to an embodiment of the engine 100 which includes multiple spools, namely the low- and high-pressure spools 42, 44. The present disclosure may be applied to other types of engines, including engines with only one spool, or with more than two spools, as appropriate. Additionally, it should be understood that the foregoing disclosure relating to temperatures measurable within the engine 100 is not exhaustive, and various physical and/or virtual sensors may be deployed within the engine 100 to assess other temperature values for other locations within the engine 100.

A maximum temperature in the thermodynamic cycle of the engine is quantified and monitored during operation. The maximum temperature usually occurs at location T4 or at location T4.1, which may be difficult to measure in at least some engines due to possible instrumentation and material temperature limitations. One approach to overcoming such difficulties is deriving the temperature at location T4 based on a temperature measured downstream from location T4, where the temperature is cooler, and where instrumentation and material temperature limitations are lowered. One example includes measuring the temperature at location T4.5. T4.5 is sometimes referred to as an inter-turbine or indicated turbine temperature (ITT) and in this embodiment is taken between the HP turbine rotor(s) 20 and LP turbine rotor(s) 26. A relationship between the temperatures at locations T4 to T4.5, used for deriving the temperature at location T4, can be determined during the development phase of the engine 100. The relationship can be provided to the engine controller 110 to derive the T4 temperature as may be required for operation of the engine 100. The present disclosure provides additional approaches for obtaining the ITT (the temperature at location T4.5), and other relevant temperatures within the engine 100, including T4 and/or T4.1.

Wth reference to FIG. 3A, there is illustrated a flowchart for a method 300 for determining an engine temperature of a gas turbine engine, for instance of the engine 100. The engine temperature determined via the method 300 can be the temperature at location T4, at location T4.1, or at any other location near or within the combustor 16. For simplicity, the description of the embodiment illustrated in FIG. 3A will refer to the temperature at location T4. The engine temperature at location T4 obtained via the method 300 can be used to produce the aforementioned ITT. For example, a scaling factor can be applied to the engine temperature at location T4 to obtain the ITT. Other modifications of the engine temperature at location T4 are also considered.

In the illustrated embodiment, the method 300 uses the equation $$Q_4 = W_4 \sqrt{T_4}/P_4 \qquad \text{(Equation 1)}$$

where $P_4$ is a combustor pressure of the combustor 16 (absolute pressure at the HPT vane throat 202); $T_4$ is a combustor temperature of the combustor 16 (absolute temperature at the HPT vane throat 202, at location T4.1, or at any other suitable location); $W_4$ is a vane mass flow (a measure of mass flow of gases at the HPT vane throat 202); and $Q_4$ is a corrected vane mass flow (a corrected measure of the mass of gases at the HPT vane throat 202, sometimes referred to as a turbine flow capacity). Equation 1 is associated with a particular state of operation of the engine 100, referred to as a choked state. The engine 100, as illustrated in FIG. 1, is said to be operated in a choked state when the corrected vane mass flow $Q_4$ reaches a maximum value, which is dependent on the geometry of the vane 19.

In the illustrated embodiment, Equation 1 is evaluated until a particular condition is met, for example at one or more time intervals, or until a number of evaluations are performed. Once the condition is met, the value of $T_4$ may be assigned as the engine temperature at location T4, may be used to produce the ITT (temperature at location T4.5), and may be used to derive other engine temperatures, as appropriate. In some cases, the method 300 is repeated at particular intervals, selected to suit each particular application of the method 300.

At step 310, the method 300 includes determining a mass flow correction factor, $Corr_{Q4}$. The mass flow correction factor $Corr_{Q4}$ is the difference between two values of the corrected vane mass flow $Q_4$, obtained via two separate approaches. A first one of the values of the corrected vane mass flow $Q_4$, called $Q_{4est}$, is obtained using Equation 1 with estimated values for $W_4$, $T_4$, and $P_4$. The second value of the corrected vane mass flow $Q_4$, called $Q_{4target}$, is based on the physical characteristics of the engine 100 when operated in a choked state: $Q_{4target}$ is the maximum corrected mass flow which can pass through the HPT vane throat 202.

At decision step 320, the method 300 includes determining whether the mass flow correction factor $Corr_{Q4}$ satisfies a mass flow correction condition. In some embodiments, the mass flow correction condition is satisfied when the corrected vane mass flow $Q_{4est}$ and the reference vane mass flow $Q_{4target}$ sufficiently match, for instance such that the mass flow correction factor $Corr_{Q4}$ is below a particular threshold, or that the mass flow correction factor $Corr_{Q4}$ is within a particular range. In one example, the mass flow correction condition is satisfied when the corrected vane mass flow $Q_{4est}$ and the reference vane mass flow $Q_{4target}$ are within 1% of one another. In some other embodiments, the mass flow correction condition is satisfied when the mass flow correction factor $Corr_{Q4}$ has been determined a particular number of times. When the mass flow correction factor $Corr_{Q4}$ does not satisfy the mass flow correction condition, the method 300 moves to step 330. When the mass flow correction factor $Corr_{Q4}$ satisfies the mass flow correction condition, the method 300 moves to step 360.

At step 330, when the mass flow correction factor $Corr_{Q4}$ does not satisfy the mass flow correction condition, the method 300 includes adjusting the estimated combustor temperature $T_{4est}$ based on the mass flow correction factor $Corr_{Q4}$ to produce an adjusted combustor temperature $T_{4adj}$. Since the mass flow correction factor $Corr_{Q4}$ is an indicator of the mismatch between the corrected vane mass flow $Q_{4est}$ and the reference vane mass flow $Q_{4target}$, it is also indicative of whether or not the estimated combustor temperature $T_{4est}$ is a suitable estimate of the engine temperature at location T4. As a result, the estimated combustor temperature $T_{4est}$ can be adjusted—or, put differently, re-estimated—based on the mass flow correction factor $Corr_{Q4}$ to generate the adjusted combustor temperature $T_{4adj}$.

In some embodiments, adjusting the estimated combustor temperature $T_{4est}$ includes adjusting the estimated vane mass flow $W_{4est}$ and re-estimating the estimated combustor temperature $T_{4est}$. In some embodiments, adjusting the estimated vane mass flow $W_{4est}$ includes adjusting an estimate of the inlet mass flow $W_1$, which can be referred to as an estimated inlet mass flow $W_{1est}$. In some further embodiments, the estimated combustor temperature $T_{4est}$ is additionally adjusted in other fashions, for instance by re-evaluating the operating conditions of the engine 100, or the like.

At step 340, the method 300 includes updating the mass flow correction factor $Corr_{Q4}$ based on the adjusted combustor temperature $T_{4adj}$. The mass flow correction factor $Corr_{Q4}$ can be updated by re-determining the first corrected vane mass flow $Q_{4est}$ using one or more adjusted values for $W_4$, $T_4$, and $P_4$ and re-computing Equation 1. Step 320 can then be performed anew using the new mass flow correction factor $Corr_{Q4}$, as illustrated in FIG. 3A.

As described hereinabove, until the mass flow correction factor $Corr_{Q4}$ satisfies the mass flow correction condition, the method 300 will continue looping through steps 320, 330, and 340. Once the mass flow correction factor $Corr_{Q4}$ satisfies the mass flow correction condition, the method 300 moves from decision step 320 to step 360.

At step 360, the method 300 includes issuing a signal to assign the estimated combustor temperature $T_{4est}$ as the engine temperature at location T4. The signal can be issued, for instance, via a controller associated with the engine 100. In some embodiments, the most recent estimated combustor temperature $T_{4est}$ is assigned as the engine temperature at location T4. In some other embodiments, the temperature assigned as the engine temperature at location T4 is a combination of one or more estimated combustor temperatures $T_{4est}$, for instance an average of the most recent estimated combustor temperature $T_{4est}$ and one or more preceding estimated combustor temperature $T_{4est}$. Other statistical approaches can also be applied as part of assigning the engine temperature at location T4, including rolling averages.

In some embodiments, assigning the estimated combustor temperature $T_{4est}$ as the engine temperature at location T4 includes assigning the estimated combustor temperature $T_{4est}$ as the ITT. The ITT can be provided to an operator of the engine 100, or of a larger system of which the engine 100 is a component. In some embodiments, the ITT is a modified version of the estimated combustor temperature $T_{4est}$. For instance, the estimated combustor temperature $T_{4est}$ is scaled by a particular factor, or has a particular constant added thereto or subtracted therefrom, in order to produce the ITT. Other approaches are also considered. The ITT can be displayed to the operator via a gauge, a screen or other display, or via any other suitable type of instrument.

Figure 3B:
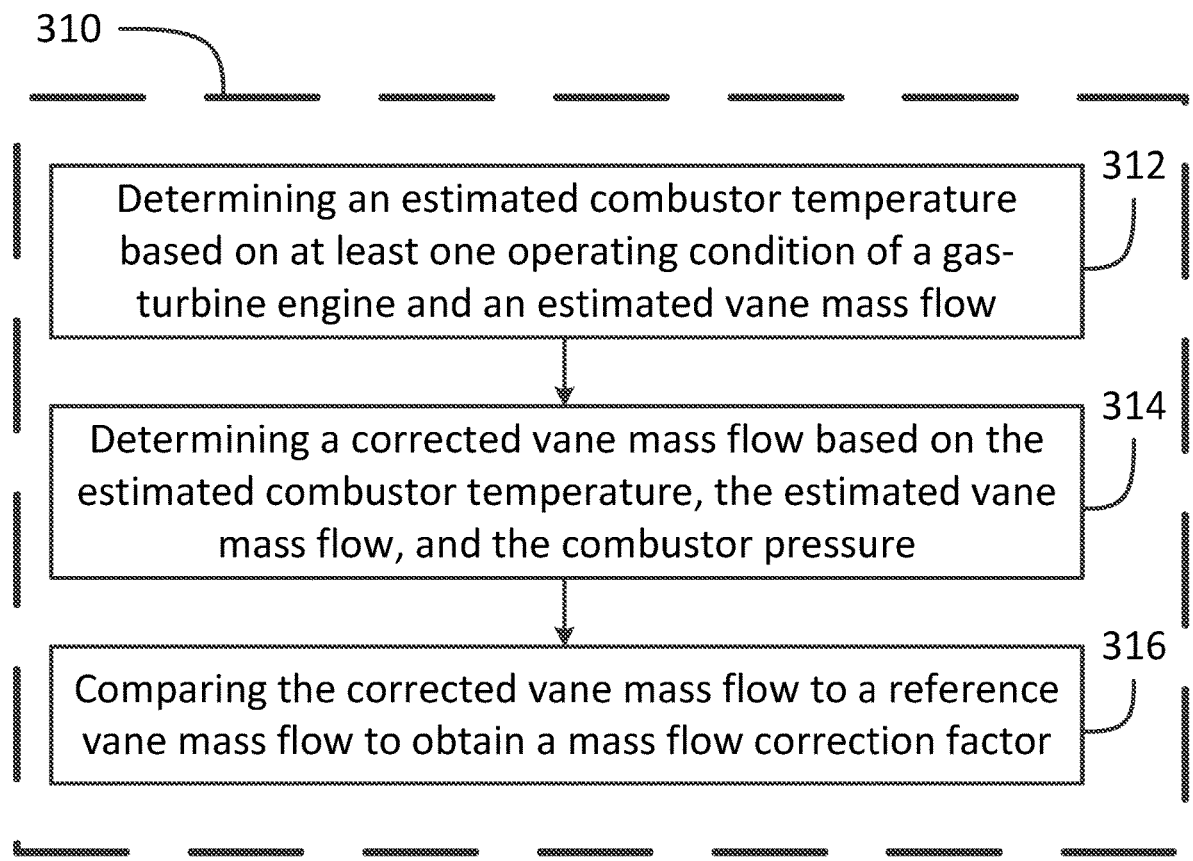

Wth additional reference to FIG. 3B, the mass flow correction factor $Corr_{Q4}$ determined at step 310 is based on comparing the two values of the corrected vane mass flow $Q_4$. In the embodiment illustrated in FIG. 3B, step 310 includes steps 312, 314, and 316.

Step 310 includes step 312 of determining an estimated combustor temperature $T_{4est}$ based on at least one operating condition of the engine 100, and based on an estimated vane mass flow $W_{4est}$. The operating condition of the engine 100 can include one or more of a power level of the engine 100, a mode of operation of the engine 100, for instance a flight stage of an aircraft of which the engine 100 is a component, a temperature measured elsewhere within the engine 100, or the like. Other operating conditions can also be used to determine the estimated combustor temperature $T_{4est}$. For example, the estimated combustor temperature $T_{4est}$ is based on one or more of an engine inlet temperature T1, an exhaust gas temperature T6, an output torque, a power turbine speed, an ambient pressure (taken at location T1 in FIG. 2), and one or more of intermediate or exit compressor temperatures or pressures. Intermediate compressor temperatures and pressures can be taken at location T2.5 in FIG. 2 (or at any other location between locations T2 and T3). Exit compressor temperatures and pressures can be taken at location T3 in FIG. 2.

The estimated vane mass flow $W_{4est}$ can be obtained based on the mass flow of another portion of the engine, for instance an inlet mass flow $W_1$. The inlet mass flow $W_1$ can be measured, estimated, or otherwise derived in any suitable fashion. For instance, a relationship between $W_1$ and $W_{4est}$ is known, and $W_1$ is derived, estimated, or instantiated (i.e. whereby an instance for $W_1$ is created) as a particular value, which is based on other operating conditions within the engine 100.

Step 310 includes step 314 of determining a corrected vane mass flow $Q_{4est}$ based on the estimated combustor temperature $T_{4est}$, the estimated vane mass flow $W_{4est}$, and the combustor pressure $P_4$. The corrected vane mass flow $Q_{4est}$ can be determined using Equation 1 described hereinabove, which becomes $$Q_{4est} = W_{4est} \sqrt{T_{4est}}/P_4$$

using the parameters obtained during previous steps.

Step 310 includes step 316 of comparing the corrected vane mass flow $Q_{4est}$ to a reference vane mass flow, referred to as $Q_{4target}$, to obtain a mass flow correction factor $Corr_{Q4}$, as per step 310. In the illustrated embodiment, the reference vane mass flow $Q_{4target}$ is established based on the physical characteristics of the vanes 19 of the engine 100. Because the engine 100 is operated in a choked state, the corrected mass flow at the HPT vane throat 202 is expected to be equivalent to the maximum corrected mass flow which can pass through the HPT vane throat 202. Thus, the reference vane mass flow $Q_{4target}$ is set to the maximum corrected mass flow, which can be established during the manufacturing process of the engine 100, as part of a testing or calibration procedure, or the like.

In one example, the mass flow correction factor $Corr_{Q4}$ is obtained by taking the difference between the corrected vane mass flow $Q_{4est}$ and the reference vane mass flow $Q_{4target}$, such that $Corr_{Q4} = Q_{4est} - Q_{4target}$. In another example, the mass flow correction factor $Corr_{Q4}$ is obtained based on a ratio of the corrected vane mass flow $Q_{4est}$ and the reference vane mass flow $Q_{4target}$, such that $Corr_{Q4} = Q_{4est}/Q_{4target}$. Other approaches for determining the mass flow correction factor $Corr_{Q4}$ are also considered.

Figure 3C:
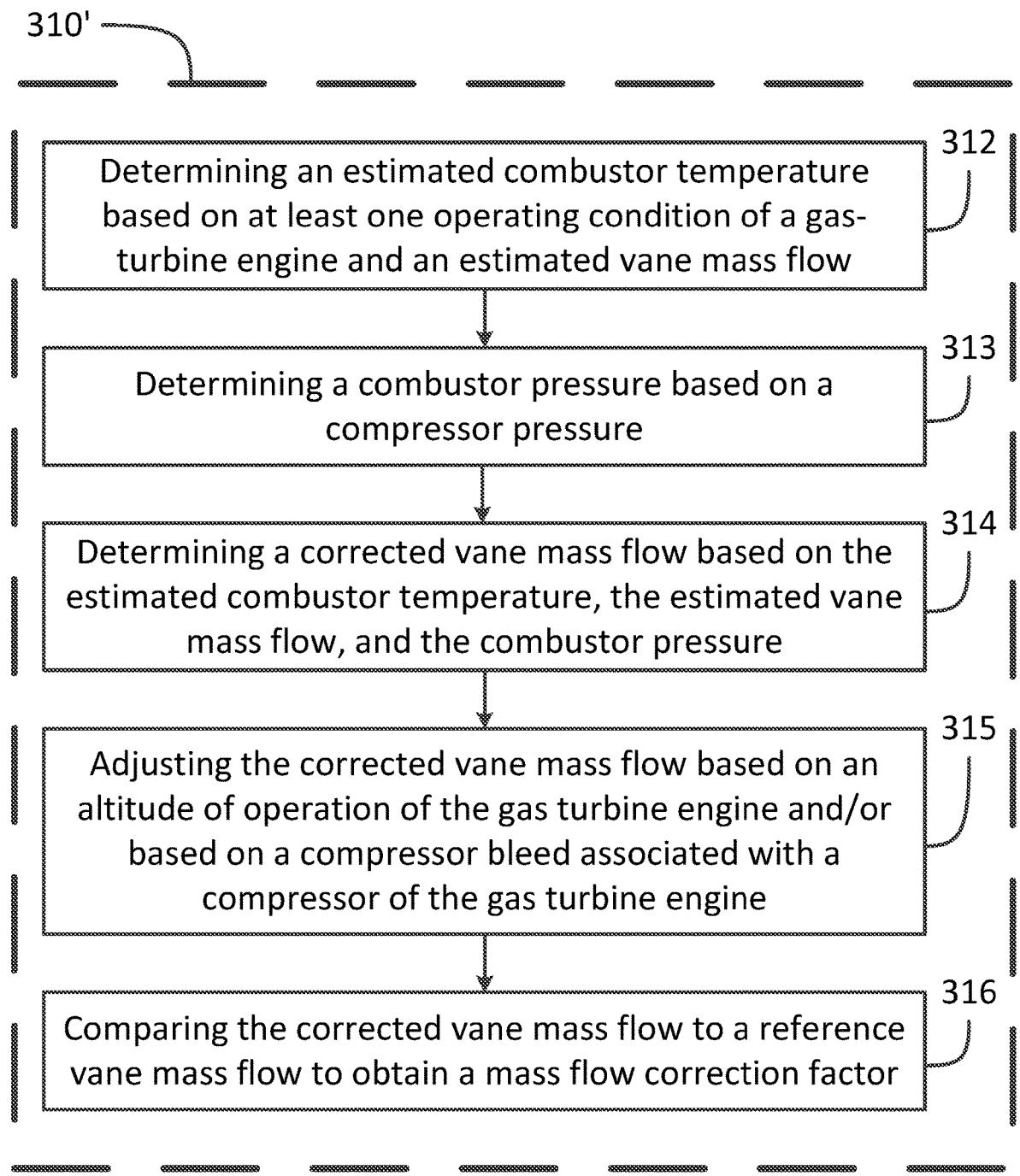

Wth reference to FIG. 3C, an alternative step 310 for determining the mass flow correction factor $Corr_{Q4}$ is illustrated as step 310'. The step 310' includes step 312 of determining an estimated combustor temperature $T_{4est}$, based on at least one operating condition of the engine 100, and based on an estimated vane mass flow $W_{4est}$. Step 312 illustrated in FIG. 3C is substantively similar to step 312 of FIG. 3B.

The step 310' includes step 313 of determining a combustor pressure $P_4$ based on a compressor pressure $P_3$. In the illustrated embodiment, the compressor pressure $P_3$ is the pressure at the outlet to the high-pressure compressor stages $14_3$. It should be noted, however, that the compressor pressure $P_3$ can be based on another pressure value elsewhere within the engine 100, depending on the structure of the engine 100. The relationship between the combustor pressure $P_4$ and the compressor pressure $P_3$ can be established based on one or more thermodynamic principles, or from schedules or other established relationships.

The step 310' includes step 314 of determining a corrected vane mass flow $Q_{4est}$ based on the estimated combustor temperature $T_{4est}$, the estimated vane mass flow $W_{4est}$, and the combustor pressure $P_4$. Step 314 illustrated in FIG. 3C is substantively similar to step 314 of FIG. 3B.

The step 310' includes step 315 of adjusting the corrected vane mass flow $Q_{4est}$ based on one or more factors. For example, the corrected vane mass flow $Q_{4est}$ is adjusted based on an altitude of operation of the engine 100, for instance in cases in which the engine 100 is operated as part of an aircraft. In another example, the corrected vane mass flow $Q_{4est}$ is adjusted based on a compressor bleed associated with one or more of the compressors of the engine 100, including the two high-pressure compressor stages $14_2$ and $14_3$ and/or the low-pressure compressor stage $14_1$. Other approaches for adjusting the corrected vane mass flow $Q_{4est}$ are also considered.

The step 310' includes step 316 of comparing the corrected vane mass flow $Q_{4est}$ to a reference vane mass flow, referred to as $Q_{4target}$, to obtain a mass flow correction factor $Corr_{Q4}$, as per step 310. Step 316 illustrated in FIG. 3C is substantively similar to step 316 of FIG. 3B.

Figure 4:
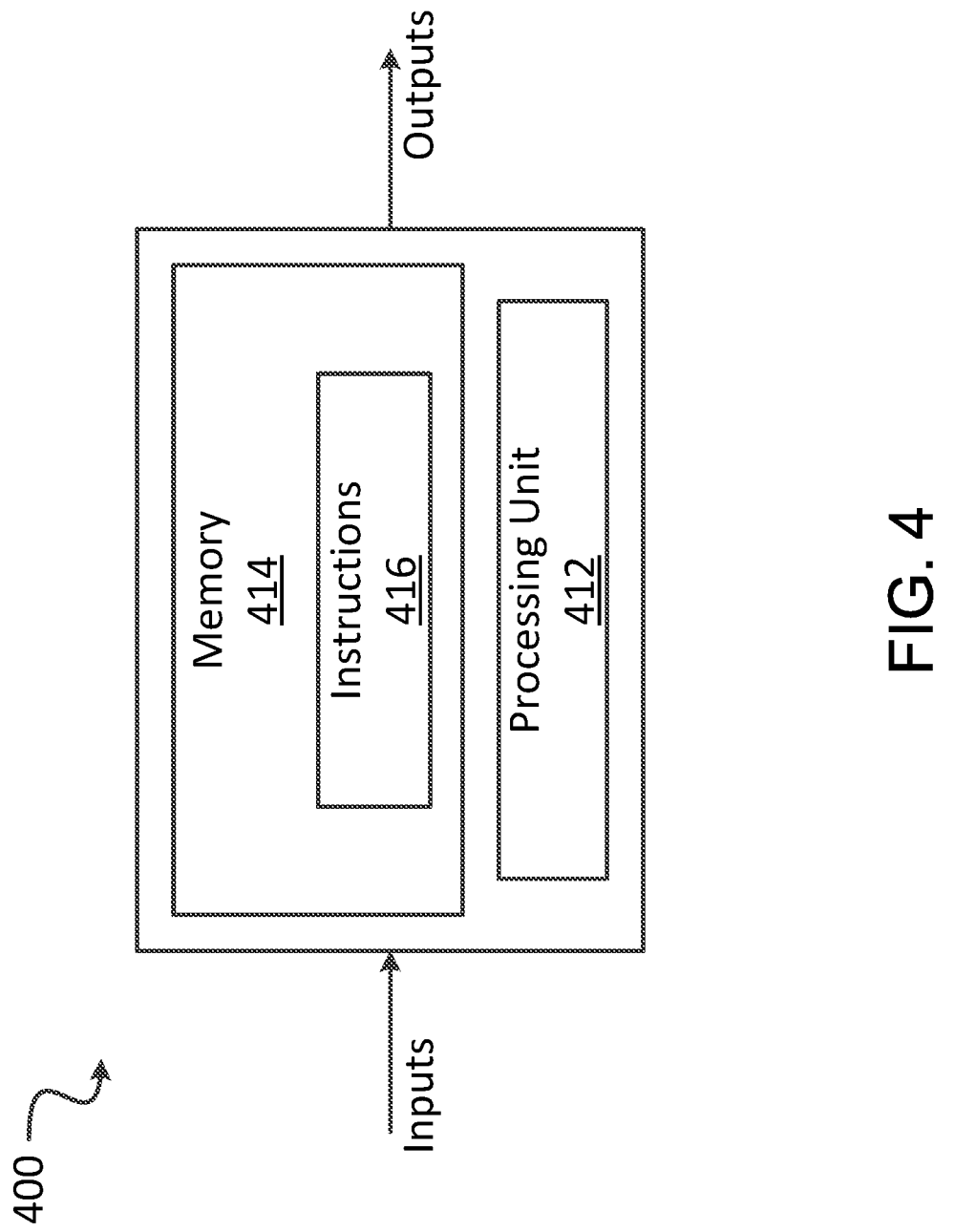
FIG. 4 is a block diagram of an example computing device for implementing the method of FIG. 3.

Wth reference to FIG. 4, there is illustrated an embodiment of a computing device 400 for implementing part or all of the method 300 described above. The computing device 400 can be used to perform part or all of the functions of the engine controller 110 of the engine 100. In some embodiments, the engine controller 110 is composed only of the computing device 400. In some embodiments, the computing device 400 is within the engine controller 110 and cooperates with other hardware and/or software components within the engine controller 110. In both cases, the engine controller 110 performs the method 300. In some embodiments, the computing device 400 is external to the engine controller 110 and interacts with the engine controller 110. In some embodiments, some hardware and/or software components are shared between the engine controller 110 and the computing device 400, without the computing device 400 being integral to the engine controller 110. In this case, the engine controller 110 can perform part of the method 300.

The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause the functions/acts/steps specified in the method 300 described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

It should be noted that the computing device 400 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 400 substantially in real-time.

Figure 5:
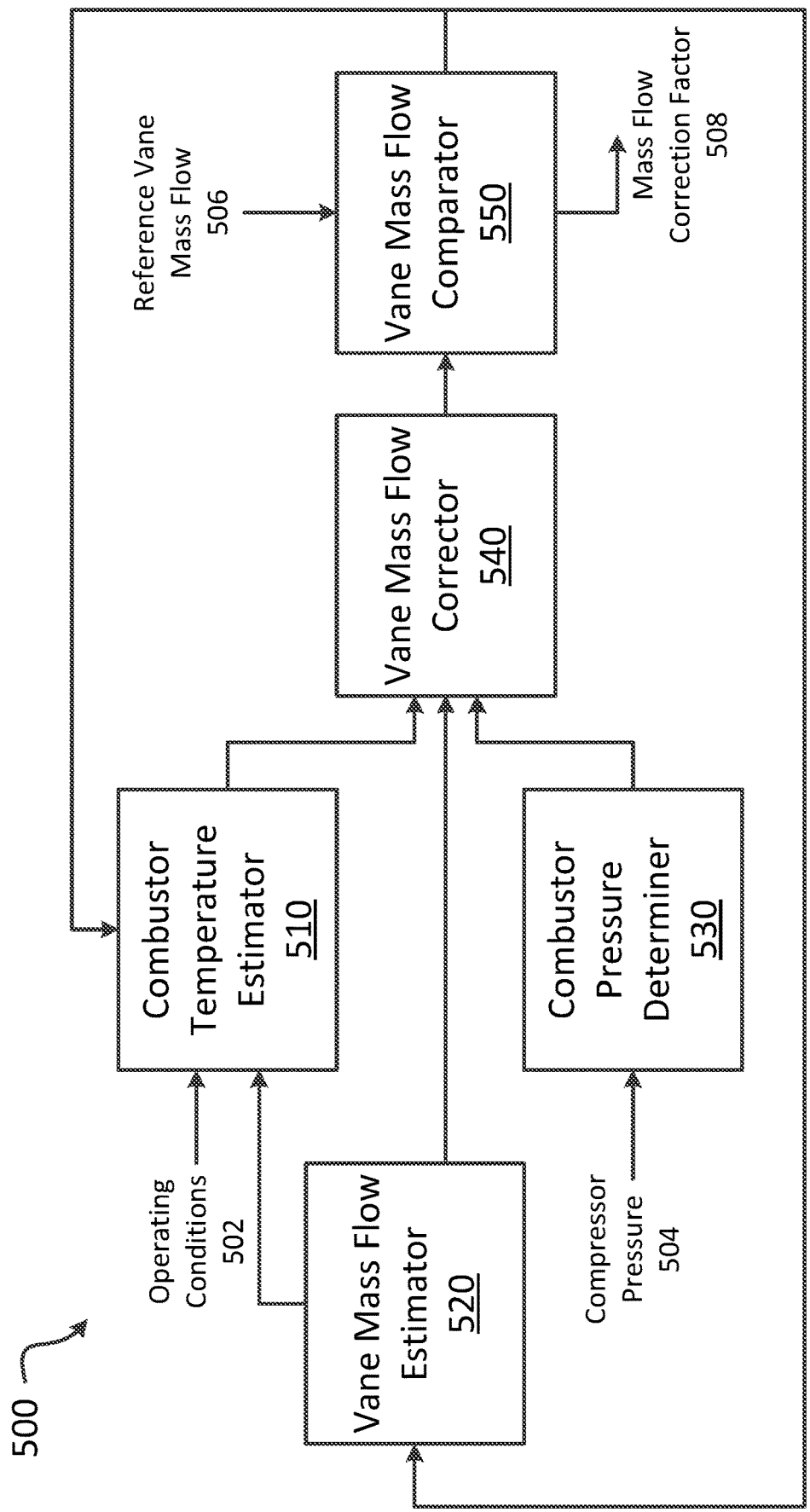
FIGS. 5 and 6 are block diagrams of example implementations of at least part of the computing device of FIG. 4.

Wth reference to FIG. 5, there is illustrated an example system 500 for determining an engine temperature of a gas turbine engine, for instance the engine temperature at location T4 of the engine 100. The system 500 is, for example, an example implementation of part or all of the computing device 400. The system 500 includes a combustor temperature estimator 510, a vane mass flow estimator 520, a combustor pressure determiner 530, a vane mass flow corrector 540, a vane mass flow comparator 550, as well as an input providing operating conditions 502, an input providing a compressor pressure 504, and an input providing a reference vane mass flow 506.

The combustor temperature estimator 510 receives one or more operating conditions 502 of the engine 100 as an input. The combustor temperature estimator 510 also receives a vane mass flow $W_4$ from the vane mass flow estimator 520, and a mass flow correction factor $Corr_{Q4}$ from the vane mass flow comparator 550. When no mass flow correction factor $Corr_{Q4}$ is available, the combustor temperature estimator 510 can receive an initial value for the mass flow correction factor $Corr_{Q4}$, which can be any suitable value, or obtains no input from the vane mass flow comparator 550. The combustor temperature estimator 510 produces an estimated combustor temperature $T_{4est}$. The combustor temperature estimator 510 also adjusts the estimated combustor temperature $T_{4est}$.

The vane mass flow estimator 520 produces an estimated vane mass flow $W_{4est}$, which is provided to the combustor temperature estimator 510 and to the vane mass flow corrector 540. The estimated vane mass flow $W_{4est}$ produced by the vane mass flow estimator 520 can be determined based on a variety of inputs, or using one or more starting values of the estimated vane mass flow $W_{4est}$. The vane mass flow estimator 520 can also receive the mass flow correction factor $Corr_{Q4}$ from the vane mass flow comparator 550, when available. The vane mass flow estimator 520 additionally adjusts the estimated vane mass flow $W_{4est}$ based on the mass flow correction factor $Corr_{Q4}$.

The combustor pressure determiner 530 receives a measure of the compressor pressure 504, denoted as $P_3$, via an input. The combustor pressure determiner 530 determines the combustor pressure $P_4$ using the compressor pressure 504 ($P_3$).

The vane mass flow corrector 540 receives the estimated combustor temperature $T_{4est}$ from the combustor temperature estimator 510, the estimated vane mass flow $W_{4est}$ from the vane mass flow estimator 520, and the combustor pressure $P_4$ from the combustor pressure determiner 530. The vane mass flow corrector 540 uses the estimated combustor temperature $T_{4est}$, the estimated vane mass flow $W_{4est}$, and the combustor pressure $P_4$ to determine a corrected vane mass flow $Q_{4est}$. For example, the vane mass flow corrector 540 can apply Equation 1 discussed hereinabove. In some embodiments, the vane mass flow corrector 540 can also adjust the corrected vane mass flow $Q_{4est}$ based on one or more factors, including an altitude of operation of the engine 100, a compressor bleed of the engine 100, and the like.

The vane mass flow corrector 540 provides the corrected vane mass flow $Q_{4est}$ to the vane mass flow comparator 550, which also receives the reference vane mass flow 506, denoted as $Q_{4target}$, via an input 506. The vane mass flow comparator 550 compares the corrected vane mass flow $Q_{4est}$ the reference vane mass flow 506 ($Q_{4target}$) to obtain a mass flow correction factor $Corr_{Q4}$.

When the mass flow correction factor $Corr_{Q4}$ satisfies the associated mass flow correction condition, the vane mass flow comparator 550 outputs the mass flow correction factor 508, denoted as $Corr_{Q4}$, for instance by issuing a signal. When the mass flow correction factor 508 ($Corr_{Q4}$) does not satisfy the associated condition, the vane mass flow comparator 550 can provide the mass flow correction factor 508 ($Corr_{Q4}$) to the combustor temperature estimator 510, so that the combustor temperature estimator 510 can adjust the estimated combustor temperature $T_{4est}$. The system 500 can then update the mass flow correction factor 508 ($Corr_{Q4}$) based on the adjusted combustor temperature.

Figure 6:
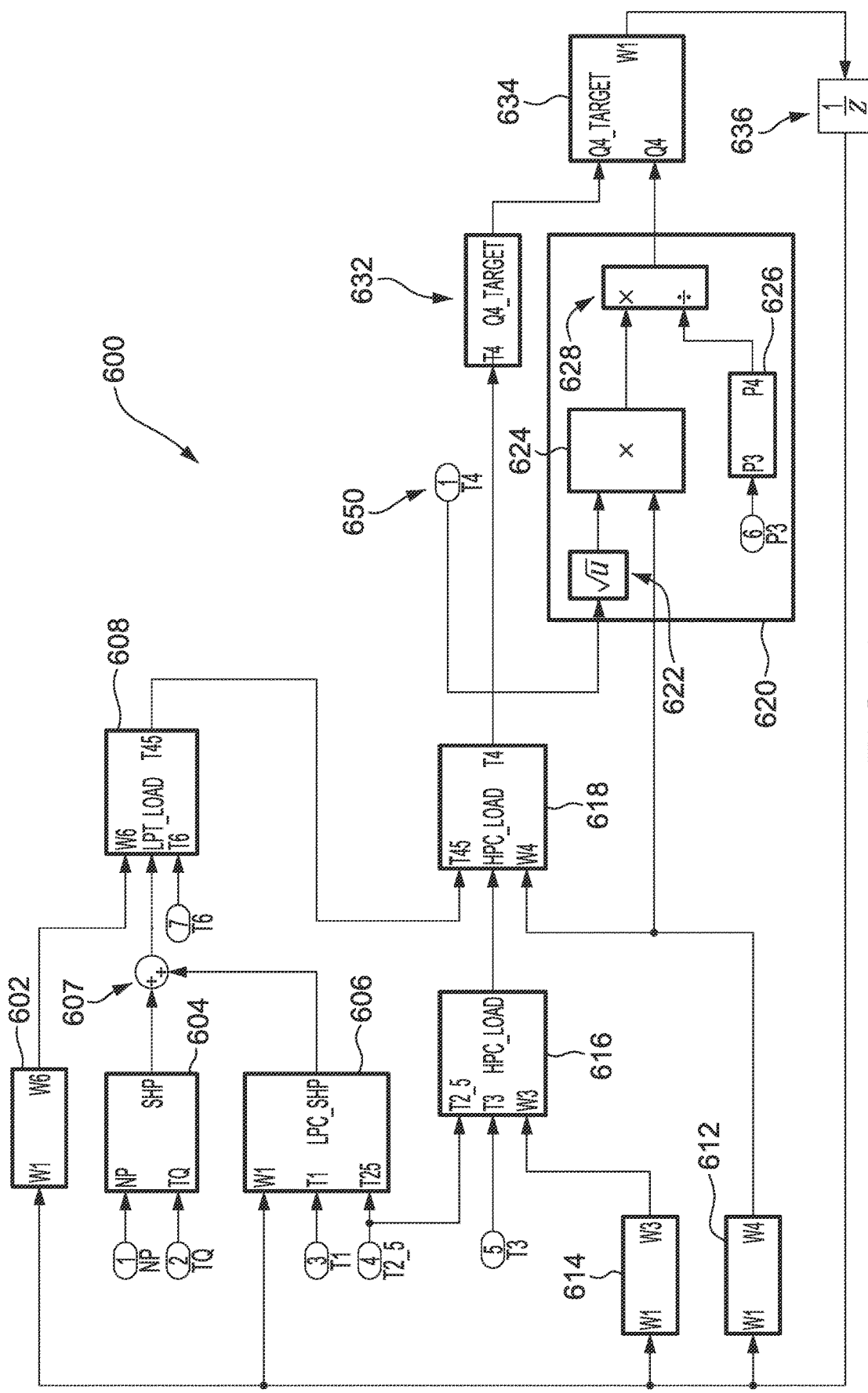

Wth reference to FIG. 6, there is illustrated an alternative system 600 for determining an engine temperature of a gas turbine engine, for instance the engine temperature at location T4 of the engine 100. The system 600 includes a plurality of interconnected blocks, which each perform a function. The particular implementation of each of the blocks in the system 600 can employ one or more thermodynamic relationships which can be known, derivable via experiments, or the like.

Block 602 receives an inlet mass flow $W_1$ and produces an exhaust mass flow $W_6$, which is provided to block 608. Block 604 receives a power turbine speed NP and an engine output torque TQ of the engine from inputs, and produces an engine output power SHP. Block 606 receives the inlet mass flow $W_1$, as well as an inlet temperature $T_1$, and a high-pressure compressor temperature $T_{2.5}$ from inputs, and produces a low-pressure spool output power $LPC_{SHP}$. The engine output power SHP and the low-pressure spool output power $LPC_{SHP}$ are added via adder 607 and provided to block 608. Block 608 receives the output of adder 607, the exhaust mass flow $W_6$ from block 602, and an exhaust temperature $T_6$ from an input, and produces an inner-turbine temperature $T_{4.5}$, which is provided to block 618.

Block 612 receives the inlet mass flow $W_1$ and produces a vane mass flow $W_4$, which is provided to blocks 618 and 620. Block 614 receives the inlet mass flow $W_1$ and produces a compressor mass flow $W_3$, which is provided to block 616. Block 616 receives the high-pressure compressor temperature $T_{2.5}$ from block 606, the compressor mass flow $W_3$ from block 614, and a compressor temperature $T_3$ from an input, and produces a high-pressure compressor load $HPC_{LOAD}$, which is provided to block 618. It should be noted that the compressor temperature $T_3$ provided to block 614 can be a measured value or a synthesized value, depending on the implementation of the system 600 and of the engine 100. Block 618 receives the inner-turbine temperature $T_{4.5}$ from block 608, the high-pressure compressor load $HPC_{LOAD}$ from block 616, and the vane mass flow $W_4$ from block 612, and produces a combustor temperature $T_4$ (for instance, $T_{4est}$).

The combustor temperature $T_4$ is provided to block 620, to block 632, or to an output 650. For example, if the combustor temperature $T_4$ as produced by block 618 is found to produce a value of the corrected vane mass flow which sufficiently matches the reference vane mass flow (i.e., the mass flow correction factor $Corr_{Q4}$ satisfies the mass flow correction condition), then the combustor temperature $T_4$ as produced by block 618 can be output at 650.

Block 620 includes sub-blocks 622, 624, 626, and 628, and serves to implement Equation 1. Sub-block 622 produces a square-root of the combustor temperature $T_4$. Sub-block 624 multiplies the square root of the combustor temperature $T_4$ by the vane mass flow $W_4$. Sub-block 626 receives the compressor pressure $P_3$ and produces the combustor pressure $P_4$. Sub-block 628 receives the product of sub-block 624 and the combustor pressure $P_4$ from sub-block 626 and performs a division operation, which produces the corrected vane mass flow $Q_4$.

Block 632 produces the reference vane mass flow $Q_{4target}$, which is provided to block 634. Block 634 compares the reference vane mass flow $Q_{4target}$ from block 632 to the corrected vane mass flow $Q_4$ from block 620, and produces a mass flow correction factor $Corr_{Q4}$. The mass flow correction factor $Corr_{Q4}$ can then be used to adjust the inlet mass flow $W_1$, which is provided from block 634 to blocks 602, 606, 612, and 614 after being fed through a delay block 636.

When the mass flow correction factor $Corr_{Q4}$ is found to satisfy the associated condition, the combustor temperature $T_4$ produced by block 618 can be output at 650. Additional operations can be performed to the output 650, including scaling or other modifications, for instance to produce the aforementioned ITT.

The methods and systems described herein may be implemented in a high level procedural or object oriented programming or scripting language, or a combination thereof, to communicate with or assist in the operation of a computer system, for example the computing device 400. Alternatively, the methods and systems described herein may be implemented in assembly or machine language. The language may be a compiled or interpreted language. Program code for implementing the methods and systems for monitoring a temperature of a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for determining an engine temperature for a gas turbine engine, comprising:
   determining an estimated combustor temperature for a combustor of the gas turbine engine based on at least one operating condition of the gas turbine engine and an estimated vane mass flow for the gas turbine engine;
   determining a corrected vane mass flow for the gas turbine engine based on the estimated combustor temperature, the estimated vane mass flow, and a combustor pressure for the combustor of the gas turbine engine; and
   comparing the corrected vane mass flow to a reference vane mass flow to obtain a mass flow correction factor;
   when a condition associated with the mass flow correction factor is not satisfied:
      adjusting the estimated combustor temperature based on the mass flow correction factor to produce an adjusted combustor temperature; and
      updating the mass flow correction factor based on the adjusted combustor temperature; and
   when the condition associated with the mass flow correction factor is satisfied, issuing, via a controller associated with the gas turbine engine, a signal to assign the estimated combustor temperature as the engine temperature, the controller using the engine temperature to quantify and monitor a maximum temperature in a thermodynamic cycle of the gas turbine engine during operation of the gas turbine engine for assisting at least one of the controller and an operator of the gas turbine engine in modulating at least one of a fuel flow provided to the engine, modulating a position and orientation of variable geometry mechanisms within the engine, and modulating a bleed level of the engine.

2. The method of claim 1, wherein the at least one operating condition of the gas turbine engine comprises at least one of a flight mission stage and an engine power level.

3. The method of claim 1, wherein the estimated vane mass flow is based on an estimated inlet mass flow for an inlet of the gas turbine engine.

4. The method of claim 1, further comprising determining the combustor pressure based on a compressor pressure for a compressor of the gas turbine engine.

5. The method of claim 1, further comprising adjusting the corrected vane mass flow based on an altitude of operation of the gas turbine engine.

6. The method of claim 1, further comprising adjusting the corrected vane mass flow based on a compressor bleed associated with a compressor of the gas turbine engine.

7. The method of claim 1, wherein the estimated combustor temperature is a temperature at an inlet of a high-pressure turbine of the gas turbine engine, the high-pressure turbine upstream of a low-pressure turbine of the gas turbine engine.

8. The method of claim 7, wherein the estimated combustor temperature is a temperature at a vane throat for the high-pressure turbine of the gas turbine engine.

9. The method of claim 1, wherein the engine temperature is an inter-turbine temperature, and wherein issuing the signal comprises generating the inter-turbine temperature by applying a scaling factor to the estimated combustor temperature and issuing the signal to cause the inter-turbine temperature to be displayed to the operator of the gas turbine engine.

10. The method of claim 1, wherein the condition associated with the mass flow correction factor comprises an evaluation of whether the mass flow correction factor is less than a threshold.

11. A system for determining an engine temperature for a gas turbine engine, comprising:
a processing unit; and
a non-transitory computer-readable medium having stored thereon instructions executable by the processing unit for:
determining an estimated combustor temperature for a combustor of the gas turbine engine based on at least one operating condition of the gas turbine engine and an estimated vane mass flow for the gas turbine engine;
determining a corrected vane mass flow for the gas turbine engine based on the estimated combustor temperature, the estimated vane mass flow, and a combustor pressure for the combustor of the gas turbine engine; and
comparing the corrected vane mass flow to a reference vane mass flow to obtain a mass flow correction factor;
when a condition associated with the mass flow correction factor is not satisfied:
adjusting the estimated combustor temperature based on the mass flow correction factor to produce an adjusted combustor temperature; and
updating the mass flow correction factor based on the adjusted combustor temperature; and
when the condition associated with the mass flow correction factor is satisfied, issuing, via a controller associated with the gas turbine engine, a signal to assign the estimated combustor temperature as the engine temperature, the controller using the engine temperature to quantify and monitor a maximum temperature in a thermodynamic cycle of the gas turbine engine during operation of the gas turbine engine for assisting at least one of the controller and an operator of the gas turbine engine in modulating at least one of a fuel flow provided to the engine, modulating a position and orientation of variable geometry mechanisms within the engine, and modulating a bleed level of the engine.

12. The system of claim 11, wherein the at least one operating condition of the gas turbine engine comprises at least one of a flight mission stage and an engine power level.

13. The system of claim 11, wherein the estimated vane mass flow is based on an estimated inlet mass flow for an inlet of the gas turbine engine.

14. The system of claim 11, wherein the instructions are further executable for determining the combustor pressure based on a compressor pressure for a compressor of the gas turbine engine.

15. The system of claim 11, wherein the instructions are further executable for adjusting the corrected vane mass flow based on an altitude of operation of the gas turbine engine.

16. The system of claim 11, wherein the instructions are further executable for adjusting the corrected vane mass flow based on a compressor bleed associated with a compressor of the gas turbine engine.

17. The system of claim 11, wherein the estimated combustor temperature is a temperature at an inlet of a high-pressure turbine of the gas turbine engine, the high-pressure turbine upstream of a low-pressure turbine of the gas turbine engine.

18. The system of claim 17, wherein the estimated combustor temperature is a temperature at a vane throat for the high-pressure turbine of the gas turbine engine.

19. The system of claim 11, wherein the engine temperature is an inter-turbine temperature, and wherein issuing the signal comprises generating the inter-turbine temperature by applying a scaling factor to the estimated combustor temperature and issuing the signal to cause the inter-turbine temperature to be displayed to the operator of the gas turbine engine.

20. The system of claim 19, wherein the condition associated with the mass flow correction factor comprises an evaluation of whether the mass flow correction factor is less than a threshold.

* * * * *